July 2, 1946.  F. G. PRIETO  2,403,395
COMBUSTION ENGINE
Filed Sept. 10, 1945

INVENTOR.
Fernando Prieto

Patented July 2, 1946

2,403,395

UNITED STATES PATENT OFFICE 2,403,395

COMBUSTION ENGINE

Fernando G. Prieto, Los Angeles, Calif.

Application September 10, 1945, Serial No. 615,401

2 Claims. (Cl. 123—51)

The present invention relates to an improved internal combustion engine and deals more specifically with a two-stroke cycle engine and with a novel manner of applying the power of said engine. This application is a continuation-in-part of my pending application Serial No. 579,705, filed February 26, 1945, and entitled Combustion engine, now Patent 2,399,507, April 30, 1946.

An object of the present invention is to provide an improved engine having opposed pistons in a cylinder and constructed to obtain an efficient power output.

Another object of the invention is to provide an engine of the character indicated which has an efficient weight to power output ratio and which is economical to both manufacture and operate.

Another object of the invention is to provide an improved internal combustion engine which efficiently conserves fuel.

A further object of the invention is to provide an improved internal combustion engine in which efficient scavenging of the cylinders thereof is efficiently effected.

A still further object of the invention is to provide an internal combustion engine in which opposed portions of the cylinders thereof are alternately cooled by a charge of fresh air.

A yet further object of the invention is to provide novel means operatively associated with an internal combustion engine for efficiently applying the power of said engine to move a vehicle or to perform other desired work.

The foregoing and other objects, features and advantages of the invention will be more clearly realized from the following detailed description of the structure illustrated in the accompanying drawing which shows, by way of example an engine embodying the present invention, and in which.

Figure 1:
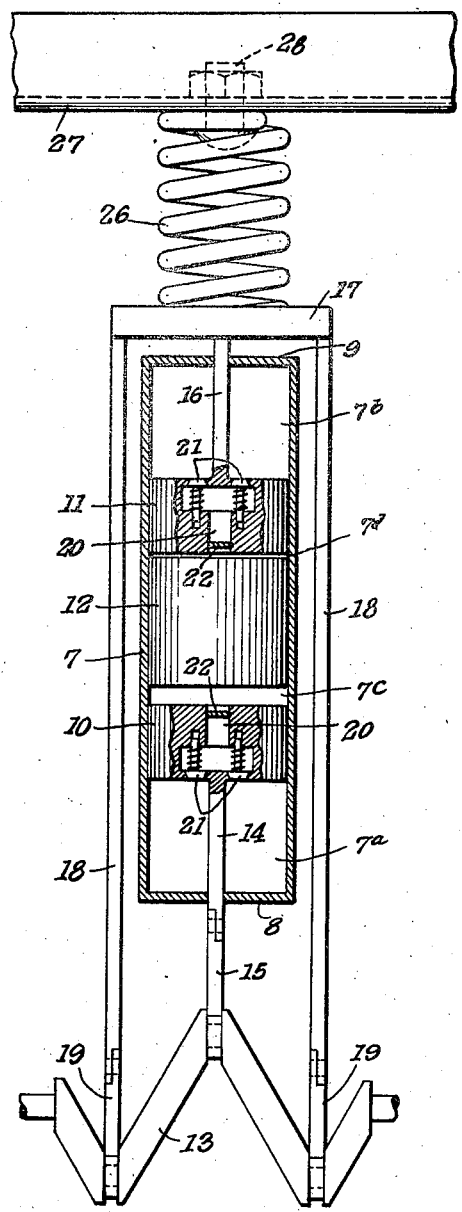
Fig. 1 is a longitudinal plan sectional view of an engine embodying the invention.

Referring to the drawing in greater detail, the engine shown comprises an elongated cylinder 7, which is closed at its ends 8 and 9, and is provided with a pair of opposed working pistons 10 and 11. A free piston 12 is disposed between the working pistons 10 and 11 for free movement in the cylinder 7.

The engine further includes a crankshaft 13 and means operatively connecting the crankshaft and the working pistons 10 and 11. To this end the piston 10 is provided with a piston rod 14 which is directly connected to the crankshaft 13 by means of a crank rod 15; and the piston 11 is provided with a piston rod 16 which is connected to an inertia member 17 disposed outside of the cylinder 7 and beyond the end 9 thereof, said inertia member 17 being in turn connected to the crankshaft 13 by means of connecting rods 18 arranged longitudinally on either side of the cylinder 7, and crank rods 19 similar to the crank rod 15.

Each of the working pistons 10 and 11 is provided with a longitudinal passage 20 controlled by poppet valves 21 and butterfly or flap valve 22, said valves opening inwardly to allow fluid to pass from the outer to the inner faces of each of said working pistons.

Each end of the cylinder 7 is provided with a fuel line 23 for admitting a fuel charge to said cylinder by displacing a back pressure valve 24 in each of said lines. Said fuel line has at each end a valve 25 which reciprocates for controlling the air and fuel ports in one position, closes its related fuel line and permits air to enter the respective portion of the cylinder 7. Such a condition is shown at the lower end of Fig. 2. In its other position shown in the upper end of Fig. 2 the valve 25 permits flow of fuel to the respective portion of the cylinder 7. Said cylinder is also provided with exhaust valves 29 for the gases of combustion of the engine, said valves being operated in a typical manner to alternately open and close in synchrony with the operation of the engine.

The engine structure also includes means such as a compression spring arranged to be acted on by the inertia member 17; to compress when said inertia member is propelled outwardly and to expand when said inertia member reverses its motion.

The engine above set forth may be used in various ways. Herein, it will be described with relation to a vehicle which it propels accordingly; the spring is secured to a transverse member 27 of said vehicle as by means of a bolt 28. It, therefore, will be seen that the engine is, generally, disposed in the plane or line of movement of a vehicle of which the member 27 is a transverse component.

The valves 21 and 22 of the working pistons 10 and 11 are arranged to open during the outstroke of said pistons only when the pressure on the outer face of said pistons is greater than atmosphere.

Suitable operating mechanism of conventional design may be provided for operating the valves 25 and 29 in timed relation with the operation of the engine. Said mechanism may either be driven by the engine or by timed outside means.

Figure 2:
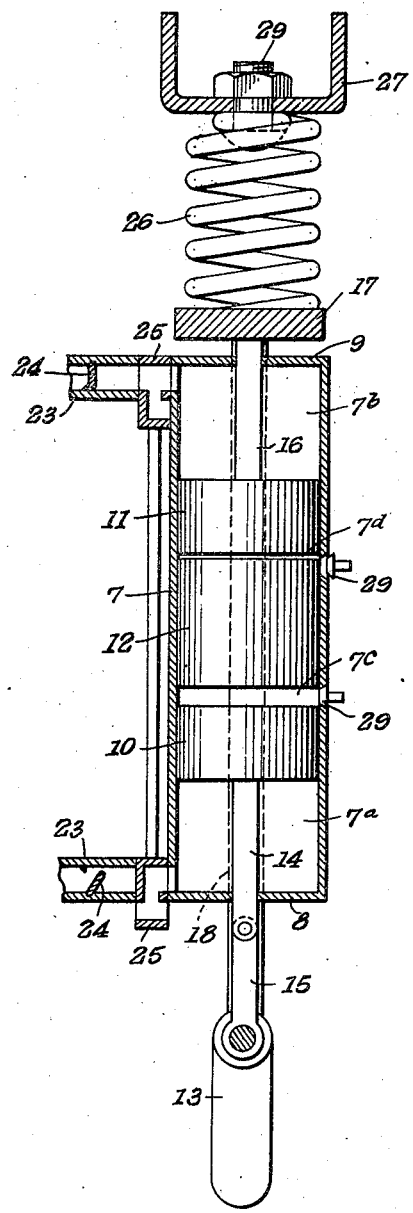
Fig. 2 is a longitudinal sectional view taken at right angles to the plane of section of Fig. 1.

The operation of the present structure is as follows:

During the in-stroke of piston 10, atmosphere air is drawn in the portion 7a of the cylinder 7. Similarly, during the instroke of piston 11, a fuel charge is drawn into the portion 7b of said cylinder. At the end of said in-stroke of pistons 10 and 11, a fuel charge which had previously been displaced into the space 7c between the working piston 10 and the free piston 12, is ignited by a suitable spark or other firing means (not shown). The space 7c thus becomes a combustion chamber. The resulting gas expansion in chamber 7c causes the out-stroke of the working pistons 10 and 11 to begin, said pistons moving outwardly and oppositely with the same velocity. Piston 10 receives its moving force directly from the expanding gases, but the piston 11 receives its thrust from the free piston 12 which is propelled by the expanding gases of combustion. During said out-stroke of pistons 10 and 11, the position of the valves 25 remain as shown in Fig. 2. It will be seen (1) that the air charge in cylinder portion 7a, after effecting cooling of said cylinder portion and of the piston 10, will be expelled through the relative valve 25, since said air is still under atmospheric pressure and the valves 21 in the piston 10 remain closed; and (2) that the fuel charge in the cylinder portion 7b will be compressed during said out-stroke to close the fuel valve 24. Said pressure will open the valves 21 and 22 of the piston 11 to allow the fuel charge to pass through passage 20 into the space 7d between the pistons 11 and 12. It follows then that the free piston 12, instead of following the outward movement of the working piston 11, gradually slows up and then reverses its movement in a direction toward the piston 10. Such movement is the result of both the incoming fuel charge and the gradual loss of force of the fully expanded gases of combustion.

At the end of the out-stroke of the working pistons, the valves 25 will move to open the lower fuel line and close the upper one, and, simultaneously, reverse the position of the exhaust valves 29. As the next in-stroke of the pistons 10 and 11 is initiated the combustion chamber 7c is exhausted through the lower one of the valves 29 as the free piston 12, being impelled by the incoming fuel charge, comes in contact with the piston 10, and said fuel charge is compressed by the piston 11 in the space 7d which now becomes the combustion chamber. Upon ignition of this fuel charge, the above described operation is repeated except that during the in-stroke of piston 10 a fuel charge is drawn into the cylinder portion 7a and during the in-stroke of piston 11 an air charge is drawn into the cylinder portion 7b.

It will be evident that upon each power stroke of the piston 11, the inertia member 17 thrusts upon and compresses the spring 26 to transmit a thrust or push on the transverse member 27 of a vehicle. The energy thus stored in the spring will aid the propelling of the vehicle by a series of cushioned blows, and, also, upon recoil of said spring, institute the in-stroke cycle of the engine.

It is further evident that the crankshaft 13, also, receives power from the engine. It follows that this crankshaft power may be used in combination with the forces applied through the inertia member 17, or, by suitable shiftable means, either application of the engine force may be applied.

Various fuels may be used. For instance, carbureted air comprising a spray mixture of oil and oxygen or oil mixed with vapors of liquid oxygen are effective.

Only the essentials of my engine structure have been disclosed and it is obvious that skilled persons can readily incorporate such attending instrumentalities that may be needed to complete the structure. Further, many changes may be made in the construction and arrangement of the parts without departing from the spirit and scope of the invention as claimed. I, therefore, desire to reserve to myself such variations that fall within the scope of the appended claims.

I claim:

1. A two-stroke cycle internal combustion engine comprising a crankshaft, at least one cylinder associated with the crankshaft, a pair of opposed working pistons in each cylinder, a free piston freely movable between said working pistons to form a combustion chamber between itself and its related working pistons alternately, means directly connecting one working piston to the crankshaft, and means including an inertia member connecting the other working piston to said crankshaft.

2. The device as characterized in claim 1 to which is added a spring having one end secured to a rigid member and its other end in engagement with the inertia member for intermittent compression thereof by said inertia member.

FERNANDO G. PRIETO.